United States Patent
Kanai

(10) Patent No.: US 8,485,064 B2
(45) Date of Patent: Jul. 16, 2013

(54) COMPOSITE WAVE GEAR DRIVE

(75) Inventor: Satoru Kanai, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 1008 days.

(21) Appl. No.: 12/481,130

(22) Filed: Jun. 9, 2009

(65) Prior Publication Data

US 2009/0320643 A1    Dec. 31, 2009

(30) Foreign Application Priority Data

Jun. 26, 2008 (JP) ................................. 2008-167329

(51) Int. Cl.
*F16H 33/00* (2006.01)

(52) U.S. Cl.
USPC .......................................................... 74/640

(58) Field of Classification Search
USPC .......................................................... 74/640
See application file for complete search history.

(56) References Cited

U.S. PATENT DOCUMENTS

| | | | | |
|---|---|---|---|---|
| 4,601,216 A | * | 7/1986 | Inoue et al. | 74/640 |
| 4,974,470 A | * | 12/1990 | Ishikawa et al. | 74/640 |
| 5,123,300 A | * | 6/1992 | Himmelein et al. | 74/640 |
| 5,775,178 A | * | 7/1998 | Asawa et al. | 74/640 |
| 5,937,710 A | * | 8/1999 | Gould et al. | 74/640 |
| 7,421,990 B2 | * | 9/2008 | Taye et al. | 123/90.17 |
| 7,484,436 B2 | * | 2/2009 | Kiyosawa | 74/640 |
| 7,552,664 B2 | * | 6/2009 | Bulatowicz | 74/640 |
| 7,836,786 B2 | * | 11/2010 | Zhang et al. | 74/461 |
| 2002/0144570 A1 | * | 10/2002 | Goold | 74/640 |
| 2007/0039414 A1 | * | 2/2007 | Takemura | 74/640 |
| 2007/0101820 A1 | * | 5/2007 | Bulatowicz | 74/640 |
| 2008/0173130 A1 | * | 7/2008 | Zhang et al. | 74/640 |
| 2009/0139357 A1 | * | 6/2009 | Ishikawa | 74/461 |
| 2009/0260469 A1 | * | 10/2009 | Kanai | 74/434 |

FOREIGN PATENT DOCUMENTS

| | | |
|---|---|---|
| JP | 2796109 B2 | 9/1998 |
| JP | 3942249 B2 | 7/2007 |

* cited by examiner

*Primary Examiner* — Ha D Ho
*Assistant Examiner* — Jude Agendia
(74) *Attorney, Agent, or Firm* — Buchanan Ingersoll & Rooney PC

(57) ABSTRACT

In a composite wave gear drive, a flexspline (having a number of teeth Nf) is disposed on the inner side of first and second circular splines (numbers of teeth Nc1 and Nc2, respectively). One side of the flexspline is bent into an elliptical shape by a first wave generator, the other side of the flexspline is bent into an elliptical shape by a second wave generator, and the flexspline meshes with the first and second circular splines. The first wave generator is a rotational input component, the second wave generator is a reduced-speed rotational output component, and the first and second circular splines are kept from rotating. The number of teeth is set such that Nc2=Nc1+2 and Nc1=Nf+2. A backlash-free gear drive having a low reduction ratio can be obtained.

6 Claims, 1 Drawing Sheet

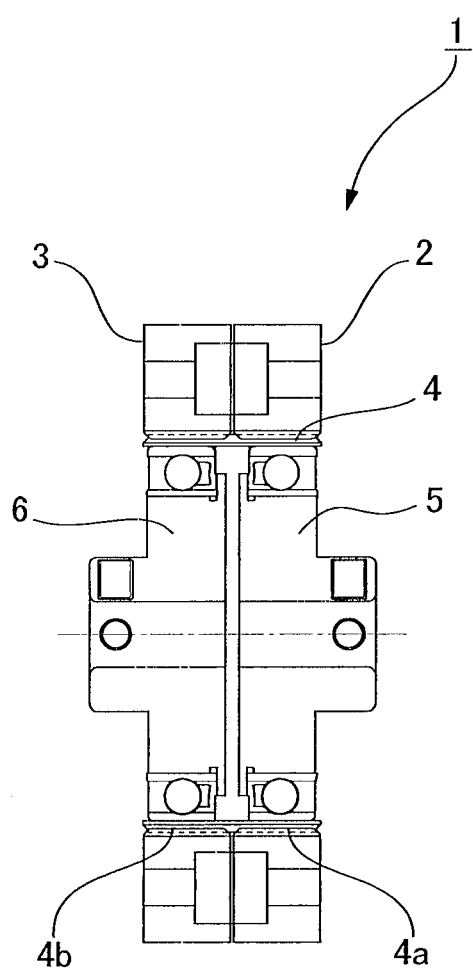

COMPOSITE WAVE GEAR DRIVE

TECHNICAL FIELD

The present invention relates to a composite wave gear drive capable of achieving a low reduction ratio.

BACKGROUND ART

Backlash can occur in low-reduction-ratio gear drives that are available at present, none of which are free of backlash like wave gear drives are. Backlash-free wave gear drives typically have high reduction ratios; i.e., 1/50 or higher The operating principle dictates that these wave gear drives are not suitable for use as low-reduction-ratio gear drives that have a reduction ratio of approximately 1/10. Cup, silk-hat, and flat wave gear devices are disclosed in Patent Documents 1, 2.
[Patent Document 1] Japanese Patent No. 3942249
[Patent Document 2] Japanese Patent No. 2796109

SUMMARY OF THE INVENTION

With the foregoing issues in view, it is an object of the present invention to provide a composite wave gear drive that can be used as a backlash-free gear drive having a low reduction ratio.

In order to solve the abovementioned problems, the composite wave gear drive of the present invention is characterized in comprising: a first circular spline and a second circular spline, which are coaxially disposed in parallel; a cylindrical flexspline capable of meshing with both of the first and second circular splines; a first wave generator that radially bends a first flexspline portion on one side of the flexspline in an axial direction, and causes the first flexspline portion to partially mesh with the first circular spline, and a second wave generator that radially bends a second flexspline portion on the other side of the flexspline in the axial direction, and causes the second flexspline portion to partially mesh with the second circular spline; wherein a number of teeth is set such that:

$$Nc2>Nc1$$

$$Nc1>Nf$$

where Nc1 is a number of teeth on the first circular spline, Nc2 is a number of teeth on the second circular spline, and Nf is a number of teeth on the flexspline.

In a case in which the composite wave gear drive of this construction is used as a backlash-free gear drive having a low reduction ratio, the first wave generator may be a rotational input component, the second wave generator may be a reduced-speed rotational output component, and the first and second circular splines may be kept in a non-rotatable state.

In a case in which the composite wave gear drive is used as a backlash-flee gear drive having a high reduction ratio, in the same manner as a typical wave gear drive, the first wave generator may be used as a rotational input component, the second circular spline may be used as a reduced-speed rotational output component, the second wave generator may be kept in a non-rotatable state, and the first circular spline may be kept in a non-rotatable state.

In the composite wave gear drive of the present invention, the difference in number of teeth between each of the gears when the first and second wave generators cause the flexspline bend into an elliptical shape and mesh with the first and second circular splines at positions on either end of a major axis of the ellipse may be set to be a multiple of 2, as shown below $$Nc2=Nc1+2m (m \text{ is a positive integer})$$

$$Nc1=Nf+2n (n \text{ is a positive integer})$$

The composite wave gear drive of the present invention has a composite structure wherein the flexspline is a shared component of unitary construction, while each of the circular spline and wave generator is disposed respectively in pairs. The first wave generator is a rotational input component, and the second wave generator is configured as a reduced-speed rotational output component, whereby it is possible to obtain a backlash-free gear drive having a low reduction ratio. When the second circular spline is used as the reduced-speed rotational output component, it is possible to obtain a backlash-free gear drive having a high reduction ratio, as with an ordinary wave gear drive.

BRIEF DESCRIPTION OF THE DRAWINGS

FIG. 1 is a schematic cross-sectional view of a composite wave gear drive to which the present invention is applied.

DETAILED DESCRIPTION OF A PREFERRED EMBODIMENT

An embodiment of a composite wave gear drive to which the present invention is applied is described below with reference to the accompanying drawing.

FIG. 1 is a schematic cross-sectional view of the composite wave gear drive according to the present embodiment. A composite wave gear drive 1 comprises an annular first circular spline 2 and an annular second circular spline 3, which are coaxially disposed in parallel. A cylindrical flexspline 4 capable of coaxially meshing with both the first and second circular splines 2, 3 is disposed on the inner side of the circular splines. A width of the flexspline 4 in the axial direction spans the first and second circular splines 2, 3.

A first wave generator 5 and a second wave generator 6 having an elliptical outline are fitted on the inner side of the flexspline 4 in a state of being coaxially disposed in parallel The first wave generator 5 is in a position facing the first circular spline 2, and bends a first flexspline portion 4a located on one side of the flexspline 4 in the axial direction into an elliptical shape. The first flexspline portion 4a meshes with the first circular spline 2 at positions on either end of a major axis of the ellipse. Similarly, the second wave generator 6 is in a position facing the second circular spline 3, and bends a second flexspline portion 4b located on the opposite side of the flexspline 4 in the axial direction into an elliptical shape. The second flexspline portion 4b meshes with the second circular spline 3 at positions on either end of a major axis of the ellipse.

A number of teeth is set such that:

$$Nc2>Nc1$$

$$Nc1>Nf$$

where Nc1 is the number of teeth on the first circular spline 2, Nc2 is the number of teeth on the second circular spline 3, and Nf is the number of teeth on the flexspline 4.

For example, in the present embodiment, a difference in number of teeth between each of the gears is set to be a multiple of 2.

$$Nc2=Nc1+2m (m \text{ is a positive integer})$$

$$Nc1=Nf+2n (n \text{ is a positive integer})$$

Typically, the difference in number of teeth is 2 (n=1, m=1).

In the composite wave gear drive 1 having this structure, the first wave generator 5 is used as a rotational input component, and is coupled to a motor shaft or another high-speed-rotation shaft. The second wave generator 6 is used as a reduced-speed rotational output component, and is coupled to a load-side member. The first and second circular splines 2, 3 are kept in a non-rotatable state.

In the composite wave gear drive 1 constricted in this manner, when the first wave generator 5 rotates at high speed, the locations at which the flexspline 4 and the first circular spline 2 mesh move in a circumferential direction, and the difference in number of teeth therebetween produces relative rotation at a dramatically reduced speed. Since the first circular spline 2 is fixed, the flexspline 4 rotates. The second wave generator causes the other side of the flexspline 4 to mesh with the second circular spline 3, which has more teeth than the first circular spline 2. Therefore, the second wave generator 6, which is the rotational output component, rotates at a higher speed due to the rotation of the flexspline 4, and the overall effect is such that a reduced-speed rotational output is obtained, the high-speed input rotation having been reduced using a low reduction ratio.

The reduction ratio R of the composite wave gear drive 1 of the present example is defined by the following formula.

$$R=(Nc1-Nf)/(Nc2-Nf)$$

For example, when Nf=200, Nc1=202, and Nc2=204:

$$R=(202-200)/204-200)=\frac{1}{2}$$

resulting in a gear drive that has zero backlash at low reduction ratios.

Other Embodiments

In a case in which the abovedescribed composite wave gear drive 1 is to be used as a high-reduction-ratio, backlash-free gear drive in the same manner as a typical wave gear drive, the first wave generator 5 may be used as the rotational input component, the second circular spline 3 may be used as the reduced-speed rotational output component, and the second wave generator 6 may be kept in a non-rotatable state.

The invention claimed is:

1. A composite wave gear drive, comprising:
    a first circular spline and a second circular spline, which are coaxially disposed in parallel;
    a cylindrical flexspline capable of meshing with both of the first and second circular splines;
    a first wave generator that radially bends a first flexspline portion on one side of the flexspline in an axial direction, and causes the first flexspline portion to partially mesh with the first circular spline; and
    a second wave generator that radially bends a second flexspline portion on the other side of the flexspline in the axial direction, and causes the second flexspline portion to partially mesh with the second circular spline; wherein the first wave generator is separated from the second wave generator; wherein
    a number of teeth is set such that:

$Nc2>Nc1$ $Nc1>Nf$ where Nc1 is a number of teeth on the first circular spline. Nc2 is a number of teeth on the second circular spline, and Nf is a number of teeth on the flexspline.

2. The composite wave gear drive according to claim 1, wherein
    the first wave generator is a rotational input component;
    the second wave generator is a reduced-speed rotational output component; and
    the first and second circular splines are kept in a non-rotatable state.

3. The composite wave gear drive according to claim 1, wherein
    the first wave generator is a rotational input component;
    the second circular spline is a reduced-speed rotational output component;
    the second wave generator is kept in a non-rotatable state; and
    the first circular spline is kept in a non-rotatable state.

4. The composite wave gear drive according to claim 1, wherein
    the flexspline is bent into an elliptical shape by the first and second wave generators, and meshes with the first and second circular splines at positions on either end of a major axis of the elliptical shape; and $Nc2=Nc1+2m$ ($m$ is a positive integer)

$Nc1=Nf+2n$ ($n$ is a positive integer).

5. The composite wave gear drive according to claim 2, wherein
    the flexspline is bent into an elliptical shape by the first and second wave generators, and meshes with the first and second circular splines at positions on either end of a major axis of the elliptical shape; and $Nc2=Nc1+2m$ ($m$ is a positive integer)

$Nc1=Nf+2n$ ($n$ is a positive integer).

6. The composite wave gear drive according to claim 3, wherein
    the flexspline is bent into an elliptical shape by the first and second wave generators, and meshes with the first and second circular splines at positions on either end of a major axis of the elliptical shape; and $Nc2=Nc1+2m$ ($m$ is a positive integer)

$Nc1=Nf+2n$ ($n$ is a positive integer).

* * * * *